J. A. GANO.
FURNACE FOR LOCOMOTIVE AND OTHER BOILERS.
No. 10,396. Reissued Oct. 23, 1883.
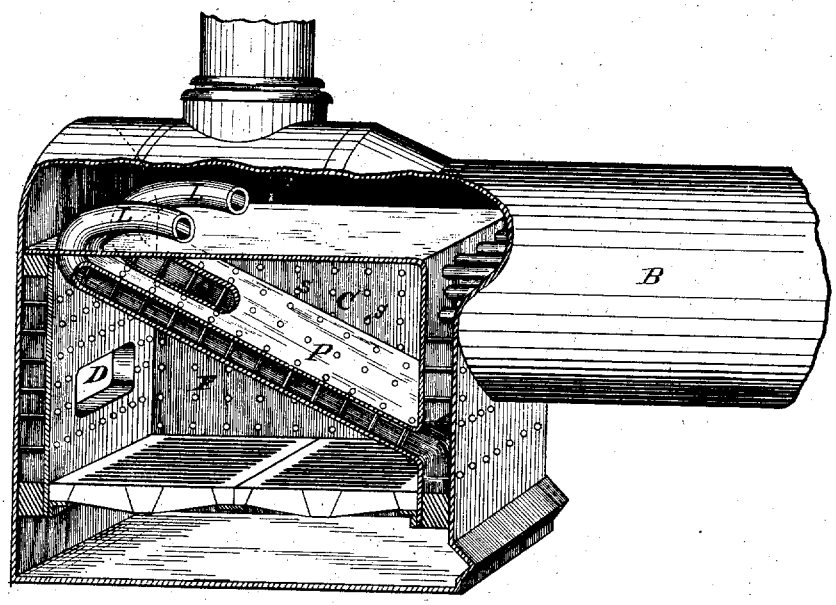
Witnesses:
E. D. Walker
W. A. Jones
Inventor:
John A. Gano
by his Attorney
R. H. Eibs

UNITED STATES PATENT OFFICE.

JOHN A. GANO, OF CINCINNATI, OHIO.

FURNACE FOR LOCOMOTIVE AND OTHER BOILERS.

SPECIFICATION forming part of Reissued Letters Patent No. 10,396, dated October 23, 1883.

Original No. 274,482, dated March 27, 1883. Application filed September 10, 1883.

*To all whom it may concern:*

Be it known that I, JOHN A. GANO, of Cincinnati, in the county of Hamilton and State of Ohio, have invented certain new and useful Improvements in Furnaces for Locomotive and other Boilers; and I do hereby declare the following to be a full, clear, and exact description of the invention, which will enable others skilled in the art to which it appertains to make and use the same.

This device is so simple that it is thought to be sufficient for its comprehension to present a view of its form and manner of application in a single drawing, which shows a side view of the interior of a fire-box or furnace with the improvement in place. The drawing is explained by the use of letters, referring to its several parts and to its essential peculiarities.

The improvement referred to in this application is especially adapted for use in locomotive and portable boilers; but it can be advantageously applied in combination with other forms of boilers, particularly such as have water-walls about their furnaces or water-walls depending from the boilers for backs of their furnaces, and as permit at the same time the passage of the gases of combustion directly through their flues. It is also applicable for use in the vaporization of fluids in forms of boilers constructed for such purposes. Its objects are to stimulate active circulation of the fluid contents of boilers, and to promote the combustion of gases proceeding from the burning fuel, thereby generating steam rapidly and economizing fuel largely.

This invention consists of a water-partition of peculiar form, terminating at its upper end in two legs, and so placed in a fire-box or furnace as to divide the same into two parts, and to secure thereby the application of the heat of the furnace to the best possible advantage. This water partition or diaphragm is placed in the fire-box or furnace diagonally, reaching from the water-wall at the rear end of the fire-box or furnace at any point, or rather at any line between the grate-bars and the lower line of the flues of the boiler, or at or near the bottom of the boiler, that may be most convenient, up to a point or line in the crown-sheet near its front end, through which its legs pass. It is designed that the hollow space in this partition shall usually be of the same thickness as the water-jacket or water-walls of the fire-box or furnace, though it may be thicker or thinner throughout or in parts, as shall best adapt it to the work to be performed by it. Its width is to conform to the interior width of the fire-box or furnace as near as may be. It may be attached to the sides of the fire-box its entire length, though not necessarily so; but it is to have no interior connection with the sides of the fire-box. Throughout its length it is to be a separate water-chamber, connecting with the water-space in the boiler at its ends only. It is to be firmly attached to the rear water-wall, depending from the boiler at the point or line referred to or indicated above, as though it were a part of it, with an opening its full width and thickness, communicating with the said rear water-wall in such a manner as to permit of a free flow of the contents of the boiler from its bottom, or from the water-wall, where it is connected up through it, when exposed to heat toward the front openings at the top, and through them into the upper part of the boiler over the crown-sheet. The upper openings of the partition, or rather its legs, are to pass either through the crown-sheet of the boiler or through the upper edge of the front water-wall, if there be one, and are to terminate in the water-space over the crown-sheet in legs having curved extremities, which shall, at the discharge-points, be on or near the upper water-line of the boiler. Between these legs, which begin to divide or bifurcate at a point a little below the level of the upper edge of the furnace-door, is the space for the passage of the gases produced by the burning fuel into the space between the partition and the crown-sheet, which becomes a combustion-chamber, whence the unconsumed portions of them pass through the flues into the stack. The partition may curve from the line at which it leaves the water-wall and ascend to the crown-sheet at an obtuse angle to that line, if found desirable. This partition is to be of the same metal as the boiler, though it may be of other metal—as of steel, or copper, or iron—as is preferred. It is to be stayed, as are the water-walls of the fire-boxes, with stay-bolts, to give it resistance to pressure. Near its upper ends hollow stay-bolts may be passed from the outer part of the front of the wall of the furnace or fire-box, through it into the furnace or into the combustion-chamber, for the purpose of supplying air to mingle with the gases generated in the furnace. Hollow stay-bolts may also be placed in the sides of the combustion-chamber, to provide air to the chamber, all to be provided with sliding dampers, if found desirable, or to be conducted through the water-walls from the front and turned with an angle through the inner shell into the combustion-chamber. The practical results of the use of this partition are that the fluid in it, being subjected to the direct heat of the furnace, is rapidly heated and put in motion. This action of the heat provokes an active passage of the contents of the boiler through the partition from its opening at its foot to its outlets at the top, causing thorough circulation of them and a correspondingly rapid vaporization of them. These results are necessarily accompanied by great economy in fuel.

In order that this invention may be clearly understood, a drawing of it is appended to this, and the parts of it described by reference-letters as follows:

F represents the ordinary locomotive fire-box or furnace, open on its right side, which presents a showing of the partition bifurcated at about one-half its height, (it may be less or more, as found best,) in place, reaching from the rear water-wall of the furnace, near its bottom, diagonally to the upper front angle of the fire-box or furnace, terminating in two legs, which are extended into the interior of the boiler near the front end of the crown-sheet, and curving downward into or near the water-line of the boiler. The partition may, however, be so placed as to leave the rear water-wall or start from it at any point between the grate-bars and the bottom of the boiler proper. In boilers the furnaces of which have no surrounding side water-walls or water-jackets, water-walls having openings into the boilers at or near their furnace ends for the passage of the contents of the boilers into the water-backs, and thence into the partitions, may be depended from the boilers to a sufficient depth, and being connected, as shown in the drawing, with the partition, will have such a circulation of its contents as will insure its durability. The upper ends or legs of the partition can be made to enter the crown-sheet at any line that may be desirable in view of the object to be attained.

P represents a partition having a space between its two legs for the passage of the gaseous products of combustion.

O is the opening in the partition, where the legs separate, to permit the passage of the smoke into C, the combustion-chamber, between the partition and the crown-sheet.

L L are the legs of the partition, passing into the crown-sheet of the boiler.

S S are hollow stay-bolts, placed at convenience for the admission of air, and supplied with sliding valves, to regulate the amount of air that may be admitted.

B is the furnace end of the boiler proper.

D is the door of the fire-box or furnace.

The practical working of this invention is that the contents of the boiler are by it kept in active circulation through the partition, according to the well-known principle governing the action of heat applied to a water-partition of such a form and location. This manner of applying heat to the contents of a boiler causes a rapid passage of these contents through the partition from its lower part to its outlets. This forced circulation is of course stimulated by the inflaming in the combustion-chamber, where they receive admixtures of air, of the unconsumed gases generated in the fire-box or furnace. The circulation of the contents of the boiler thus secured prevents the destruction of the partition by heat, and tends to the prevention of scale and sediment in boilers of which it may be a part.

I claim, therefore, as my invention, and desire to secure by Letters Patent—

1. The combination, in a boiler-furnace or fire-box, of a water-partition, P, having legs L L, that pass through the crown-sheet and terminate in curved extremities in the water-space over or above said crown-sheet, with a rear water-wall, and with a combustion-chamber, C, for use in connection with and as a part of a boiler either for evaporation or vaporization, to which it is attached in the form, as hereinbefore described, and placed in furnace or fire-box at such an angle to the fire as shall produce the results aimed at—namely, circulation through the partition of the contents of the boiler from its bottom or lower level into or near its upper water-level at convenient points in the space above the fire-box or furnace, and thus causing continuous complete agitation of the contents of the boiler, whether the boiler be for use as steam generator or as evaporator.

2. In a boiler-furnace or fire-box, the combination of a rear water-wall depending from and having interior connection with the boiler, with a water-partition, P, having legs L L, that pass through the crown-sheet and terminate in curved extremities in the water-space over or above the crown-sheet of the boiler, so as to permit the free flow and current of the contents of the boiler through the water-wall, on through the partition, and thence through its legs into the water-space above the crown-sheet, the connection of the water-partition and the rear water-wall being made at any point between the foot thereof and the bottom of the boiler, and in such manner and form as may be preferred.

In testimony whereof I affix my signature in presence of two witnesses.

JOHN A. GANO.

Witnesses:
B. E. J. EILS,
E. S. WALKER.